United States Patent
Gao et al.

(10) Patent No.: US 8,311,142 B2
(45) Date of Patent: Nov. 13, 2012

(54) SELF-ADAPTING TRANSMISSION SCHEME OF THE CHANNEL ENVIRONMENT IN THE MULTI-ANTENNA WIRELESS TRANSMISSION SYSTEM

(75) Inventors: Xiqi Gao, Jiangsu (CN); Xiaohu You, Jiangsu (CN); Bin Jiang, Jiangsu (CN); Zhiwen Pan, Jiangsu (CN); Yuan Zhang, Jiangsu (CN)

(73) Assignee: Southeast University, Nanjing, Jiangsu (CN)

( * ) Notice: Subject to any disclaimer, the term of this patent is extended or adjusted under 35 U.S.C. 154(b) by 542 days.

(21) Appl. No.: 12/095,194

(22) PCT Filed: Nov. 24, 2006

(86) PCT No.: PCT/CN2006/003158
§ 371 (c)(1),
(2), (4) Date: Jul. 18, 2008

(87) PCT Pub. No.: WO2007/062580
PCT Pub. Date: Jun. 7, 2007

(65) Prior Publication Data
US 2008/0310542 A1    Dec. 18, 2008

(30) Foreign Application Priority Data

Nov. 29, 2005   (CN) .......................... 2005 1 0122609

(51) Int. Cl.
H04B 7/02    (2006.01)
(52) U.S. Cl. ........ 375/267; 375/260; 375/299; 375/347; 375/349

(58) Field of Classification Search .................. 375/267, 375/260, 299, 347, 349
See application file for complete search history.

(56) References Cited

U.S. PATENT DOCUMENTS

| 2006/0133530 A1* | 6/2006 | Kwak et al. ................... 375/267 |
| 2007/0099584 A1* | 5/2007 | Niu et al. ....................... 455/101 |

FOREIGN PATENT DOCUMENTS

| CN | 1489409 A | 4/2004 |
| CN | 1592482 A | 3/2005 |
| WO | WO02057838 A2 | 7/2002 |
| WO | WO2005032001 A1 | 4/2005 |

OTHER PUBLICATIONS

Abstracts of CN 1592482 and CN 1489409.

* cited by examiner

*Primary Examiner* — Kabir A Timory
(74) *Attorney, Agent, or Firm* — Thomas, Kayden, Horstemeyer & Risley, LLP

(57) ABSTRACT

An adaptive transmission scheme of the channel environment in the multi-antenna wireless transmission system can raise the spectrum use rate and power efficiency of the communication system. Compared with traditional single antenna input and single antenna output, the channel environment in MIMO wireless communication system is more complex. When the terminal is moving, the different types of channels between terminal and base station can be gone through and then its capacity can be changed more largely. Embodiments of the disclosure are directed to systems that transmit high speed data by way of a plurality of transmitting and/or receiving antennae, and particularly to a transmission scheme in different channel environments in a multi-antenna wireless transmission system.

4 Claims, 1 Drawing Sheet

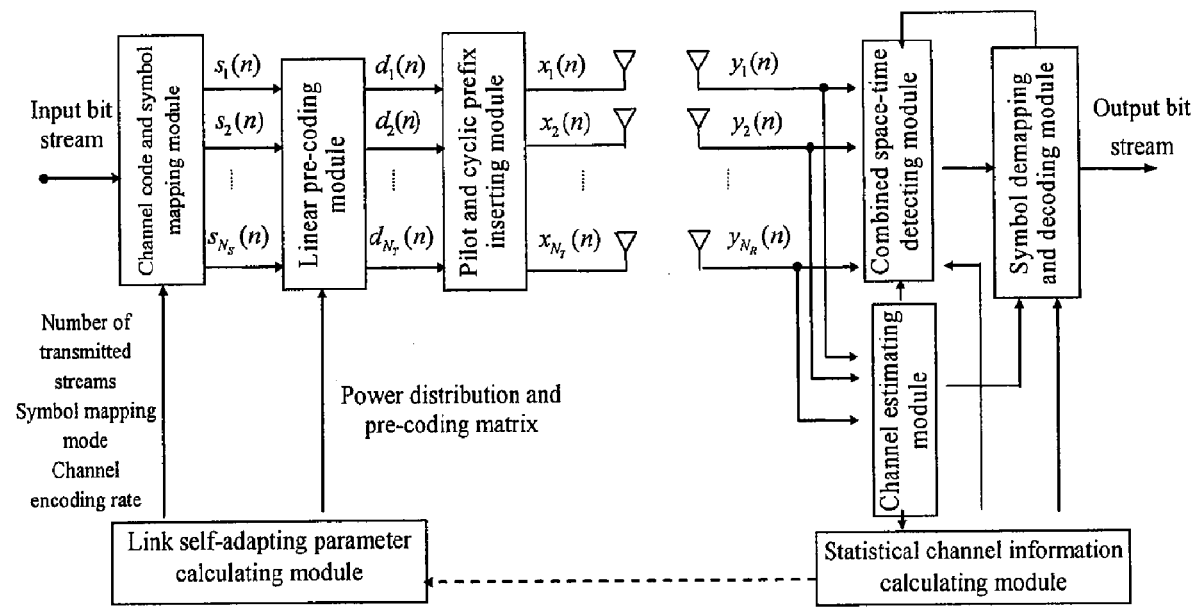

SELF-ADAPTING TRANSMISSION SCHEME OF THE CHANNEL ENVIRONMENT IN THE MULTI-ANTENNA WIRELESS TRANSMISSION SYSTEM

CROSS-REFERENCE TO RELATED APPLICATION

This application claims priority to PCT Application No. CN2006/003158, filed Nov. 24, 2006 and entitled "AN SELF-ADAPTING TRANSMISSION SCHEME OF THE CHANNEL ENVIRONMENT IN THE MULTIANTENNA WIRELESS TRANSMISSION SYSTEM", which also claims priority to Chinese Patent Application No. 200510122609.7, filing date Nov. 29, 2005.

FIELD OF THE INVENTION

The present invention relates to a mobile communication system that transmits high speed data by means of a plurality of transmitting/receiving antennae, particularly to a transmission scheme in different channel environments in a multi-antenna wireless transmission system.

BACKGROUND OF THE INVENTION

To meet the demand for future development, B3G (or 4G) mobile communication systems must support high-speed packet data transmission as high as tens of megabits per second or even hundreds of megabits per second. As wireless resources become intense increasingly, employing MIMO wireless transmission technique to exploit and utilize space resources as far as possible and raise the spectrum use rate and power efficiency has become a key in B3G mobile communication study.

Compared to traditional single antenna transmitting and single antenna receiving systems, the channel environment in MIMO wireless communication systems is more complex, and there are more factors that have influence on channel capacity; when the terminal is moving, the different types of channels between terminal and base station can be gone through and then its capacity can be changed more largely. In order to adapt to channel environment variations, different transmission methods can be used; if the channels are Rayleigh channels and relevant Rayleigh channels, space division multiplexing (SDM) and space-time coding transmission method can be used; if a strong direct path is available and a wire antenna array is used, the traditional beam shaping technique can be used; if the channels are static channels, spatial flooding transmission can be used. Apparently, to construct a practical system with a variety of techniques, the techniques must be efficient and reliable, and the implementation will be very complex. It is undoubtedly an important task to seek for a unified adaptive transmission method that is suitable for a variety of channel environments.

To implement adaptive transmission in a channel environment, the prior information of the channel must be utilized at the transmitting end. The prior information of channel can be complete or partial channel state information, wherein, partial channel state information is statistical information of the channel, including statistical information on interference and noise, Tx-correlated information, Rx-correlated information, mean value, and moving speed, etc. In a typical mobile communication environment, especially in a high-speed mobile communication environment, the channel varies rapidly with time, and the transmitting end is unable to ascertain complete channel state information; however, partial channel state information is approximately constant within a quite long period. Studies have shown: when the transmitter utilizes partial channel state information to transmit, the channel capacity and transmission reliability of MIMO system can be improved significantly.

Theoretical researches have shown: in a Tx-correlated Rayleigh fading channel environment, if the receiving end knows the channel state information and the transmitting end knows the Tx-correlated channel matrix, the optimal transmission scheme under the channel capacity maximization criterion is a characteristic mode spatial pre-filtering transmission scheme. At present, most of the efforts reported are for Tx-correlated Rayleigh flat fading channels; however, extended research on characteristic mode transmission in more generic channel environments has not been made extensively. Therefore, it is necessary to make further extended research, in order to implement a genuine unified transmission scheme applicable to a variety of channel environments.

SUMMARY OF THE INVENTION

Technical challenge: The object of the present invention is to provide a self-adapting transmission scheme of the channel environment in a multi-antenna wireless transmission system, which is applicable to a variety of typical multi-antenna channel environments, especially to distributed radio wireless network system environments.

Technical scheme: In the self-adapting transmission scheme of the channel environment in a multi-antenna wireless transmission system provided in the present invention, the statistical channel information is obtained at the receiving end from the result of channel estimation at first; then, the obtained statistical channel information is quantized and encoded to obtain feedback bit information, and the feedback bit information is transmitted to the transmitting end through a feedback channel; thereby using statistical information, the transmitting end calculates link self-adapting control parameters, which are used for controlling coding modulation and sending the pre-code; the sending end obtains the digital base band transmission signal using a characteristic mode transmission method and a random virtual selection transmission method, and the receiving end carries out self-adapting receiving by the same parameters.

The obtained statistical channel information comprises Tx/Rx-correlated channel matrix, spatial power flooding matrix, number of distinguishable channel streams Ns, and online channel capacity. The information fed back to the transmitting end is the statistical channel information; the feedback bit information is bit information on statistical channel parameters treated by differential quantization and encoding. The link self-adapting control parameters calculated from statistical channel information include the number of transmitted data streams, channel encoding mode, modulation mode, and linear pre-coding matrix, etc. The digital baseband transmitting signal at the transmitting end is obtained with a random virtual space selection transmission method and a characteristic mode-based linear pre-coding method.

For example, a MIMO wireless communication system with $N_T$ transmitting antennae and $N_R$ receiving antennae, on the basis of channel capacity analysis, a self-adapting MIMO transmission scheme as shown in FIG. 1 can be constructed by maximizing the upper limit of channel capacity. The scheme is described as follows:

(1) at the receiving end, first, channel estimation is carried out for $N_R$ digital baseband receiving signals $y_m(l)$ using the receiving pilot signal; then, the output bit streams are obtained by means of combined space-time detection, wherein, $m=1, 2, \ldots, N_R$, and $y_m(l)$ represents the receiving signal of the $m^{th}$ receiving antenna. While the detection is carried out, the statistical channel information, including Tx/Rx-correlated channel matrix, spatial power flooding matrix, number of distinguishable channel streams Ns, and online channel capacity, etc., is calculated from the channel estimation result of the current frame. With the statistical channel information, the parameters required for link self-adapting control, including channel encoding mode, modulation mode, and linear pre-coding matrix, etc., are obtained; then, these link control parameters can be used in data detection for the next frame. The statistical channel information and link control parameters of the current frame are quantized and encoded, to obtain the input to the feedback channel, including Tx-correlated channel matrix, noise variance, channel encoding mode, and modulation mode, etc. The information is fed back per frame.

(2) at the transmitting end, first, the statistical channel information received through the feedback channel is converted into link control parameters (number of streams Ns, channel encoding mode, modulation mode, linear pre-coding matrix, etc.) by a link self-adapting parameter calculating module; then, the input bit stream is treated by channel encoding and symbol mapping to obtain Ns symbol streams $s_\alpha(l)$, wherein, $\alpha=1, 2, \ldots, Ns$, and $s_\alpha(l)$ represents the $\alpha^{th}$ symbol stream; next, the Ns symbol streams are treated by linear pre-coding to obtain $N_T$ pre-coded symbol streams $d_n(l)$, wherein, $n=1, 2, \ldots, N_T$, and $d_n(l)$ represents the $n^{th}$ pre-coded symbol stream; then, cyclic prefix and pilot are inserted intermittently in the $N_T$ pre-coded symbol streams to obtain $N_T$ digital baseband signals $x_n(l)$, wherein, $n=1, 2, \ldots, N_T$, and $x_n(l)$ represents the transmission signal of the $n^{th}$ transmitting antenna.

In order to make the technical scheme and advantages of the present invention understood better, hereunder the scheme will be described in detail.

I. Obtaining Statistical Channel Information.

In the scheme, the statistical channel information comprises the following parts: Tx/Rx-correlated channel matrix, noise variance, spatial power flooding matrix, number of distinguishable channel streams, and online channel capacity, etc.

For convenience of description, here we use a $N_R \times N_T$ matrix $H_p^{(k)}$ to represent the estimated impact response in the $p^{th}$ path of the channel for the current frame at time k, wherein, $p=0, 1, \ldots, p-1, k=1, 2, \ldots, K$, K is the total number of channel samples that are used to calculate statistical channel information in each frame. $\sigma_z^2$ is the estimated noise variance of the current frame.

(1) Statistics and Characteristic Decomposition of Tx/Rx-Correlated Channel Matrix.

With the estimated channel parameter values obtained for the current frame, the Tx/Rx-correlated channel matrix of the current frame can be expressed as:

$$R_{TX}^{(cur)} = \frac{1}{K} \sum_{k=1}^{K} \sum_{p=0}^{P-1} (H_p^{(k)})^H H_p^{(k)}, \tag{1}$$

$$R_{RX}^{(cur)} = \frac{1}{K} \sum_{k=1}^{K} \sum_{p=0}^{P-1} H_p^{(k)} (H_p^{(k)})^H. \tag{2}$$

In order to afford time-domain memory feature to the correlated matrix obtained by statistics, the results obtained for adjacent frames can be smoothed with a forgetting factor β, i.e.:

$$R_{TX}^{(T)} = (1-\beta) R_{TX}^{(cur)} + \beta R_{TX}^{(T-1)}, \tag{3}$$

$$R_{RX}^{(T)} = (1-\beta) R_{RX}^{(cur)} + \beta R_{RX}^{(T-1)}. \tag{4}$$

Wherein, $R_{TX}^{(T)}$ and $R_{TX}^{(T-1)}$ represent the Tx-correlated matrix for the current frame and the previous frame respectively, and $R_{TX}^{(T)}$ and $R_{TX}^{(T-1)}$ represent the Rx-correlated matrix for the current frame and the previous frame respectively.

The $R_{TX}^{(T)}$ and $R_{RX}^{(T)}$ for the current frame are treated by characteristic decomposition, to obtain:

$$R_{TX}^{(T)} = U_t \Lambda_t U_t^H, \tag{5}$$

$$R_{TX}^{(T)} = U_r \Lambda_r U_r^H, \tag{6}$$

Wherein, $\Lambda_t = \text{diag}\{\lambda_{t,1}, \ldots, \lambda_{t,N_T}\}$, $\Lambda_r = \text{diag}\{\lambda_{r,1}, \ldots, \lambda_{r,N_R}\}$, $\lambda_{t,i}(i=1, 2, \ldots, N_T)$ and $\lambda_{r,j}(j=1, 2, \ldots, N_R)$ are characteristic values of $R_{TX}^{(T)}$ and $R_{RX}^{(T)}$ sorted in descending order, $U_t$ and $U_r$ are corresponding characteristic matrixes of $R_{TX}^{(T)}$ and $R_{RX}^{(T)}$. $U_t$ and $\Lambda_t$ are referred to characteristic mode of channel collectively, wherein, $U_t$ is an important part of the transmission pre-coding matrix.

(2) Spatial Power Distribution Matrix

In this scheme, the power distribution method is a spatial flooding method. With the characteristic decomposition result of $R_{TX}^{(T)}$ obtained with expression (5), the flooding solution for parallel channel can be expressed as:

$$\sigma_{s,i}^2 = \max\left(0, \varepsilon - \frac{\sigma_z^2}{\lambda_{t,i}}\right), \tag{7}$$

$$1 \leq i \leq N_T,$$

Wherein, threshold ε is a constant, which depends on the total transmitting power. Accordingly, the spatial power distribution matrix can be expressed as:

$$P = \text{diag}\{\sigma_{s,1}^2, \ldots, \sigma_{s,N_T}^2\}. \tag{8}$$

(3) Stream Control

An important component of adaptive MIMO transmission system is the stream control mechanism. By analyzing the statistical characteristics of channel and considering the effects of Tx-correlation, Rx-correlation, and direct path, etc. of MIMO channel comprehensively, the receiver determines the number of streams Ns that can be transmitted actually from the viewpoint of energy, and feeds back the result to the transmitter for multi-beam shaping.

After the characteristic decomposition results of $R_{TX}^{(T)}$ and $R_{RX}^{(T)}$ are determined, we can choose Ns with the following expressions: Denote:

$$Q_t = \arg\min_i \left\{\frac{\lambda_{t,i}}{\lambda_{t,1}} < \alpha_t\right\}, \tag{9}$$

$$Q_r = \arg\min_j \left\{\frac{\lambda_{r,j}}{\lambda_{r,1}} < \alpha_r\right\}. \tag{10}$$

Wherein, $\alpha_t, \alpha_r$ are stream selection factors (usually about 0.3) of transmitting end and receiving end; then, the initial value of number of transmitted streams is:

$$N_S = \min\{Q_t, Q_r\}. \tag{11}$$

The stream control method put forth in this scheme takes account of the effect of Tx-correlation, Rx-correlation, and direct path comprehensively. It is seen from expression 9 and 10: expression 9 includes direct channel path and Tx-correlated information, while expression 10 includes direct path and Rx-correlated information. It is not enough to take consideration of expression 9 or 10 individually in stream control.

In actual application, the Ns determined with expression 11 must not be higher than the number of non-zero solutions of power distribution.

(4) Online Capacity Calculation and Correction.

In this scheme, first, the instant theoretical channel capacity is calculated online from the statistical channel information of the current frame; then, the calculation result is corrected, so as to obtain the actual attainable channel capacity in the system, and then bit allocation is carried out on that basis.

After spatial flooding is carried out with P for the transmitting antennae, the equivalent signal-to-interference ratio (SIR) of each parallel sub-channel can be expressed as: $\rho_i = \lambda_{t,i} \sigma_{s,i}^2 / \sigma_z^2$. Theoretically, the traversed channel capacity (upper limit) is:

$$C = \sum_{i=1}^{N_T} \log_2(1 + \rho_i). \quad (12)$$

In actual systems, in view that the receivers can't be too complex, the upper limit of channel capacity resulted from expression 12 can't be attained completely; therefore, the result must be corrected, so as to obtain the actually attainable channel capacity:

$$\tilde{C} = f(C, \gamma). \quad (13)$$

Wherein, $f(C, \gamma)$ is the channel capacity correction function, $\gamma$ is the capacity correction factor for the current frame.

Usually, $f(C, \gamma)$ can be determined with an empirical function, $\gamma$ can be chosen according to the channel condition and the performance of detector, such as the SIR and packet error rate of output signal from the receiver after matched filtering. To facilitate understanding, hereunder an online channel capacity correction method is described.

Denote $y(k) = [y_1(k), y_2(k), \ldots, y_{N_R}(k)]^T$ represents the digital baseband transmission signal at time k, then $y(k)$ can be expressed as:

$$y(k) = \sum_{p=0}^{P-1} H_p^{(k)} x(k-p) + z(k), \quad (14)$$

Wherein, $z(k)$ is Additive White Gaussian Noise (AWGN) with variance $\sigma_z^2$, $x(k) = [x_1(k), x_2(k), \ldots, x_{N_T}(k)]^T$ is the digital baseband transmission signal at time k. The output signal after matched filtering can be expressed as:

$$r(k) = \sum_{p=0}^{P-1} (H_p^{(k)})^H y(k+p) \quad (15)$$
$$= \sum_{l=-P+1}^{P-1} A_l k(k+l) + \sum_{p=0}^{P-1} (H_p^{(k)})^H z(k+p),$$

Wherein, $$A_l = \sum_p (H_{l+p}^{(k)})^H H_p^{(k)}, (0 \le l+p, p \le P-1).$$

-continued

Denote: $\overline{A}_0 = \text{diag}\{A_0\} = \text{diag}\{a_1, a_2, \ldots, a_{N_T}\}, \quad (16)$ $\tilde{A}_0 = A_0 - \overline{A}_0,$ $B = [A_{-P+1}, \ldots, A_{-1}, \tilde{A}_0, A_1, \ldots, A_{P-1}],$ and $\tilde{x}(k) = [x^T(k-P+1), \ldots, x^T(k), \ldots, x^T(k+P-1)]^T,$ then, from expression 15:

$$r(k) = \underbrace{\overline{A}_0 x(k)}_{Signal} + \underbrace{B\tilde{x}(k)}_{Interference} + \underbrace{\sum_{p=0}^{P-1} (H_p^{(k)})^H z(k+p)}_{Noise}.$$

Since the signal energy is normalized and the noise variance is $\sigma_z^2$, the signal energy, interference energy, and noise energy are:

$$\sum_{n=1}^{N_T} a_n^2, \|B\|_F^2, \text{ and } \sum_{n=1}^{N_T} a_n \sigma_z^2.$$

Therefore, the SIR calculated with the current channel sample is:

$$\xi_k = \frac{\sum_{n=1}^{N_T} a_n^2}{\|B\|_F^2 + \sum_{n=1}^{N_T} a_n \sigma_z^2}. \quad (17)$$

The SIR obtained by statistics with all samples of the current frame is:

$$\xi_{cur} = \frac{1}{K} \sum_{k=1}^{K} \xi_k. \quad (18)$$

In order to afford time-domain memory feature to the statistical SIR, the results obtained for adjacent frames can be smoothed with a forgetting factor $\mu$, i.e.

$$\xi_{new} = (1-\mu)\xi_{cur} + \mu\xi_{old}, \quad (19)$$

Wherein, $\xi_{old}$ and $\xi_{new}$ represent the SIR of previous frame and the SIR of current frame, respectively.

Let $$\gamma = 1 + \frac{N_S}{N_T} \frac{1}{\xi_{new}}, \quad (20)$$

Then, the channel capacity correction function is:

$$\tilde{C} = f(C, \gamma) = 0.75 \frac{C}{\gamma} - 0.25. \quad (21)$$

In addition, online channel capacity estimation can further correct with packet error rate. If the packet error rate is high, the estimated online channel capacity can be reduced, otherwise it can be increased.

(5) Bit Allocation

After the correct channel capacity $\tilde{C}$ and the number of distinguishable channel streams Ns are obtained for the current frame, the encoding mode and modulation mode of each stream can be determined with a bit allocation algorithm.

Denote $\{M_i\}_{i=1}^{I}$ and $\{R_j\}_{j=1}^{J}$ as the collection of all modulation modes and the collection of all encoding modes supported by the system, $n_{ij}$ represents the number of steams with modulation mode=$M_i$ and encoding mode=$R_j$ in Ns streams, then, the solution-finding for $n_{ij}$ can be converted to the following linear integer planning task:

$$\min \delta = \tilde{C} - \sum_{i=1}^{I}\sum_{j=1}^{J} M_i R_j n_{ij} \quad (22)$$

$$s.t. \begin{cases} \sum_{i=1}^{I}\sum_{j=1}^{J} n_{ij} = N_S \\ \sum_{i=1}^{I}\sum_{j=1}^{J} M_i R_j n_{ij} \leq \tilde{C} \\ n_{ij} \text{ is a nonnegative integer, } \forall\, i,\, j. \end{cases}$$

The solution of the integer planning task described in expression 22 is referred to the optimal bit allocation scheme. In actual application, a set of results can be calculated offline for different $\tilde{C}$ and $N_S$ values. In case of implementation with hardware, table-searching is enough.

Hereunder a simple calculation example is provided. Suppose the system employs QPSK and 16QAM modulation modes and ½ data rate encoding mode, and denotes the number of streams with modulation mode QPSK and the number of streams with modulation mode 16QAM in the Ns streams as $n_{QPSK}$ and $n_{16QAM}$, then:

$$\begin{cases} n_{QPSK} = 1,\, n_{16QAM} = 0,\, N_S = 1 & \tilde{C} < 1 \\ n_{QPSK} = \lfloor \tilde{C} \rfloor,\, n_{16QAM} = 0 & 1 \leq \tilde{C} \leq N_S \\ n_{16QAM} = \lfloor \tilde{C} - N_S \rfloor,\, n_{QPSK} = N_S - n_{16QAM} & \tilde{C} > N_S. \end{cases} \quad (23)$$

II. Feedback Channel

The feedback channel is an important component of self-adapting MIMO transmission system. In TDD systems, since the frequency band used by uplink is identical to the frequency band used by downlink, it is believed that the channel parameters of uplink are identical to the channel parameters of downlink. Thus, the parameters of the channel from receiver to transmitter estimated by the transmitter can be used in the pre-coding design of the transmitter. However, in FDD systems, since the frequency band used by uplink is different to the frequency band used by downlink, the transmitter can only carry out pre-coding design with partial channel information transmitted from the receiver through the feedback channel.

It is seen from above discussion: the statistical channel information required by the transmitting end include: $U_t$, P, $N_S$, and encoding/modulation mode $n_{ij}(i=1,\ldots,I\, j=1,\ldots,J)$ for each data stream. In view of the wide dynamic range of $U_t$, high feedback channel overhead will be required if $U_t$ is fed back directly. Therefore, here, only the channel-correlated matrix $R_{TX}^{(cur)}$ obtained from the channel parameters for the current frame is fed back. $R_{TX}^{(cur)}$ is a $N_T \times N_T$ poly-symmetric Gaussian matrix. The receiver quantizes the $N_T^2$ real coefficients that form $R_{TX}^{(cur)}$ to obtain discrete values, and feeds back the values to the transmitted through the feedback channel. In order to reduce the overhead in the feedback channel further, the transmission power distribution matrix P is not transmitted directly; instead, the noise variance $\sigma_z^2$ of the channel is fed back, and then the transmission power distribution matrix P is obtained by calculation at the transmitting end. Since $n_{ij} \leq N_S \leq \min\{N_T, N_R\}$, the number of bits used by the receiver to feed back all $n_{ij}$ values will be IJ $\log_2(\min\{N_T, N_R\})$. Thanks to the memory feature introduced into the statistical quantities, the channel parameters for the current frame that are fed back can be equivalent to differential signals of the statistical quantities. Therefore, the bit information that is fed back is quantized and encoded bit information of differential signals.

III. Calculating Link Self-Adapting Parameters

The input to the module comes from the feedback channel, and there are two outputs: one output is sent to an encoding/modulating module, and the other output is sent to a linear pre-encoding module. The output $n_{ij}(i=1,\ldots,I\, j=1,\ldots,J)$ sent to the encoding/modulating module directly comes from the feedback channel, without any additional treatment. The output sent to the linear pre-encoding module comprises characteristic mode $U_t$ and spatial power flooding matrix P, which are calculated through the same procedures as those at the same receiving end. First, the Tx-correlated matrix $R_{TX}^{(T)}$ is calculated with $R_{TX}^{(cur)}$ from the feedback channel, and then is treated by characteristic decomposition to obtain $U_t$ and $\Lambda_t$; next, flooding is carried out with $\Lambda_t$ and $\sigma_z^2$ from the feedback channel to obtain P.

IV. Random Virtual Space Selection Transmission Method and Characteristic Mode-Based Linear Pre-Coding Denote $d(l)=[d_1(l), d_2(l), \ldots, d_{N_T}(l)]^T$ represents the transmission signal that is not inserted with pilot at time l, $s(l)=[s_1(l), s_2(l), \ldots, s_{N_S}(l)]^T$ represents the transmission symbols at time l. The relation between d(l) and s(l) is as follows:

$$d(l) = \left[ U_t P^{\frac{1}{2}} W / \sqrt{N_S} \right] V(l) s(l). \quad (24)$$

Wherein, $$U = U_t P^{\frac{1}{2}} W / \sqrt{N_S}$$

is the linear pre-coding matrix for the current frame, V(l) is the virtual space selection matrix at time l, $U_t$ is the Tx-correlated characteristic matrix, P is the power flooding matrix, and W is a Walsh spread spectrum matrix in $N_T$ orders.

In a self-adapting MIMO link, the number of data streams $N_S$ to be transmitted in the next frame is determined by stream control. If $N_S < N_T$, a variety of schemes are available to map the data streams to be transmitted to the transmitting antennae (e.g., antenna selection, space-time encoding, etc.). Here, a novel mapping scheme—random virtual space selection transmission technique is used, which enables separate statistics for the data streams, and thereby can effectively suppress spatial fading.

$V(l) \in R^{N_T \times N_S}$ in expression 24 is a mapping matrix related to time l. After $N_S$ is determined, there are $Q(Q \leq C_{N_T}^{N_S})$ possibilities for V(l) value: $V_0, V_1, \ldots, V_{Q-1}$ ($V_i (i=0, 1, \ldots, Q-1)$ are sub-matrixes of unit matrix $I_{N_T}$).

Usually, in order to suppress random channel fading more effectively, the mapping mode should be chosen randomly at time 1. However, in consideration of convenience in implementation, a pseudo-mapping mode is used. The mapping is carried out per frame. The mapping mode can determined with the following expression:

$$V(l)=V_{(l)Q}. \quad (25)$$

Beneficial effects: The present invention provides a self-adapting transmission scheme of the channel environment which can be used in multi-antenna transmitting and multi-antenna receiving wireless transmission systems, which is applicable to a variety of typical multi-antenna channel environments, especially to distributed radio wireless network system environments. Specifically, the present invention has the following beneficial effects.

1. It can take full advantage of spatial wireless resources, and raise the spectrum use rate and power efficiency.
2. It is adaptive to complex multi-antenna transmitting and multi-antenna receiving wireless transmission channel environments.
3. Different to transmission methods that employ different transmission techniques to adapt to the channel environment variations, the present invention employs a unified transmission technique for the transmitting end and receiving end, and can adjust parameters in a self-adapting manner; therefore, the system complexity is lower.
4. The feedback information is statistical information, and is transmitted with a differential quantization and encoding method; therefore, the bit rate of feedback information is correspondingly lower.

BRIEF DESCRIPTION OF THE DRAWINGS

FIG. 1 is a block diagram of the adaptive transmission scheme provided in the present invention.

DETAILED DESCRIPTION OF THE EMBODIMENTS

The present invention provides a technical scheme for transmission in a multi-antenna wireless transmission system, which is adaptive to variations of the channel environment. The present invention can be implemented as follows:

Receiving End:
(1) Carry out channel estimation with the received pilot signal, and calculate Tx-correlated matrix $R_{TX}^{(T)}$ and Rx-correlated matrix $R_{TX}^{(T)}$ with expressions 1-4;
(2) Calculate channel capacity correction factor γ with expressions 17-20;
(3) Carry out characteristic decomposition for $R_{TX}^{(T)}$ and $R_{RX}^{(T)}$ respectively, so as to obtain $\Lambda_t$, $\Lambda_r$, and $U_t$;
(4) Utilize the characteristic decomposition results of the correlated matrixes obtained in (3) to calculate power flooding matrix P with expressions 7-8 and noise variance $\sigma_z^2$;
(5) Utilize the characteristic decomposition results of the correlated matrixes obtained in (3) to calculate the number of transmitted streams $N_S$ with expressions 9-11;
(6) Calculate attainable channel capacity $\tilde{C}$ in the system with expressions 12-13, and obtain bit allocation scheme $n_{ij}$ (i=1, . . . , I, j=1, . . . , J) according to the expression 22;
(7) Store $U_t$, P, $N_S$, $n_{ij}$(i=1, . . . , I, j=1, . . . , J) for the current frame to the buffer, so that they can be used in data detection for the next frame;

Feedback Channel:
(8) Quantize and encode $R_{TX}^{(cur)}$, $\sigma_z^2$, and $n_{ij}$(i=1, . . . , I, j=1, . . . , J) and then send them to the feedback channel, feed back once per frame;

Transmitting End:
(9) Send $n_{ij}$(i=1, . . . , I, j=1, . . . , J) fed back from the channel to the encoding/modulating module directly for control;
(10) Calculate $R_{TX}^{(T)}$ with the expression 3 from $R_{TX}^{(cur)}$ fed back from the channel, and carry out characteristic decomposition for it to obtain $U_t$ and $\Lambda_t$;
(11) Utilize $\Lambda_t$ obtained in (10) and noise variance $\sigma_z^2$ fed back from the channel to calculate power flooding matrix P with expressions 7-8;
(12) Utilize the results obtained in (10) and (11) to calculate the linear pre-coding matrix with expressions 24-25 and use the matrix in transmission control.

The invention claimed is:

1. A self-adapting transmission scheme of a channel environment in a multi-antenna wireless transmission system, comprising:

obtaining a statistical channel information at a receiving end using a result of a channel estimation, the statistical channel information comprising a Tx and Rx-correlated channel matrix, a spatial power flooding matrix, a number of distinguishable channel streams, and an online channel capacity; then, quantizing and encoding the obtained statistical channel information to get feedback bit information, and transmitting the feedback bit information to a transmitting end through a feedback channel; wherein the transmitting end calculates a plurality of link self-adapting control parameters from the statistical channel information, the statistical channel information further being used for controlling coding modulation and sending a pre-code; wherein the transmitting end obtains a digital base band transmission signal using a characteristic mode transmission method and a random virtual space selection transmission method, and the receiving end carries out self-adapting receiving using the same parameters; and the Tx and Rx-correlated channel matrix is determined by:

$$R_{TX}^{(T)}=(1-\beta)R_{TX}^{(cur)}+\beta R_{TX}^{(T-1)}$$

$$R_{RX}^{(T)}=(1-\beta)R_{RX}^{(cur)}+\beta R_{RX}^{(T-1)}$$

where $R_{TX}^{(T)}$ represents the Tx-correlated matrix for a current frame and $R_{TX}^{(T-1)}$ represents the Tx-correlated matrix for the previous frame, $R_{RX}^{(T)}$ represents the Rx-correlated matrix for the current frame and $R_{RX}^{(T-1)}$ represents the Rx-correlated matrix for the previous frame, $R_{TX}^{(cur)}$ represents an estimated Tx-correlated matrix with channel parameters in the current frame and $R_{RX}^{(cur)}$ represents an estimated Rx-correlated matrix with the channel parameters in the current frame, and β is a forgetting factor, the spatial power flooding matrix is determined by eigenvalues of the Tx and Rx-correlated channel matrix, the number of distinguishable channel streams determined by the eigenvalues of Tx and Rx-correlated channel matrix, and the online channel capacity is determined by a channel condition and performance of a detector.

2. The self-adapting transmission scheme of channel environment in the multi-antenna wireless transmission system according to claim 1, wherein, the information fed back to the transmitting end is the statistical channel information, and the bit information that is fed back is bit information of statistical channel parameters treated by differential quantization and encoding.

3. The self-adapting transmission scheme of channel environment in the multi-antenna wireless transmission system according to claim 1, wherein, the link self-adapting control parameters calculated from the statistical channel information comprises at least one of: a number of transmitted data streams, channel encoding mode, modulation mode, and linear pre-coding matrix.

4. The self-adapting transmission scheme of channel environment in the multi-antenna wireless transmission system according to claim 1, wherein, the digital baseband transmission signal at the transmitting end is obtained with a random virtual space selection transmission method and a characteristic mode-based linear pre-coding method.

* * * * *